United States Patent [19]

Schmidt

[11] Patent Number: 4,884,724
[45] Date of Patent: Dec. 5, 1989

[54] SCREW AUGER CHEMICAL APPLICATOR

[76] Inventor: La Vern Schmidt, P.O. Box 234, Montezuma, Kans. 67867

[21] Appl. No.: 237,282

[22] Filed: Aug. 26, 1988

[51] Int. Cl.⁴ .......................................... G01F 11/00
[52] U.S. Cl. .................................. 222/623; 222/274; 222/412; 198/370; 198/669
[58] Field of Search ................. 222/608–610, 222/613, 614, 623, 270–274, 330, 318, 412, 413; 198/370, 669, 537, 550.1, 548, 569

[56] References Cited

U.S. PATENT DOCUMENTS

| | | | |
|---|---|---|---|
| 721,733 | 3/1903 | Nance | 222/273 |
| 2,264,650 | 12/1941 | Warren | 222/623 |
| 2,345,804 | 4/1944 | Gemberling et al. | 222/272 X |
| 2,569,421 | 9/1951 | Larson | 222/623 X |
| 2,626,579 | 1/1953 | Shaw | 222/272 X |
| 2,657,831 | 11/1953 | Pierce | 222/272 |
| 2,708,534 | 5/1955 | Mason et al. | 222/273 X |
| 2,713,442 | 7/1955 | McFarling et al. | 222/270 X |
| 3,039,660 | 6/1962 | Anderson | 222/318 X |
| 3,128,921 | 4/1964 | Henderson | 222/274 X |
| 3,201,005 | 8/1965 | Buhr et al. | 222/272 |

Primary Examiner—Kevin P. Shaver
Attorney, Agent, or Firm—Richard L. Miller

[57] ABSTRACT

This screw auger chemical applicator is designed to evenly and non-cloggingly feed chemical or small seed onto a ground surface. Primarily, it consists of a pulley and belt train driven by a wheel in engagement with a trailing wheel of a pair of wheels mounted to a towed frame behind a farm tractor, and the pulley and belt train drives a left and right pitched auger beneath each hopper of the applicator, for even feed from a pair of discharge openings in the hopper. A by-pass tube is also provided beneath the auger portion, for preventing compacting of the chemical or seed that could cause malfunction.

4 Claims, 1 Drawing Sheet

U.S. Patent    Dec. 5, 1989    4,884,724
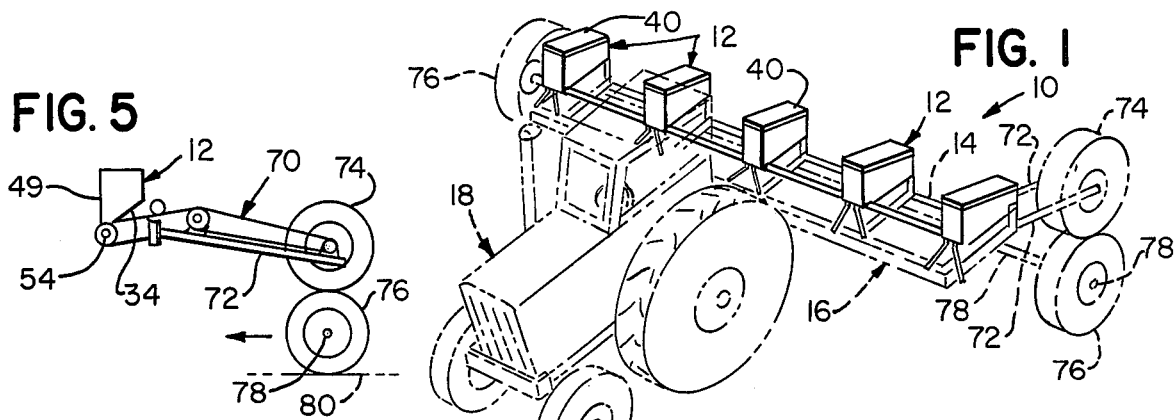
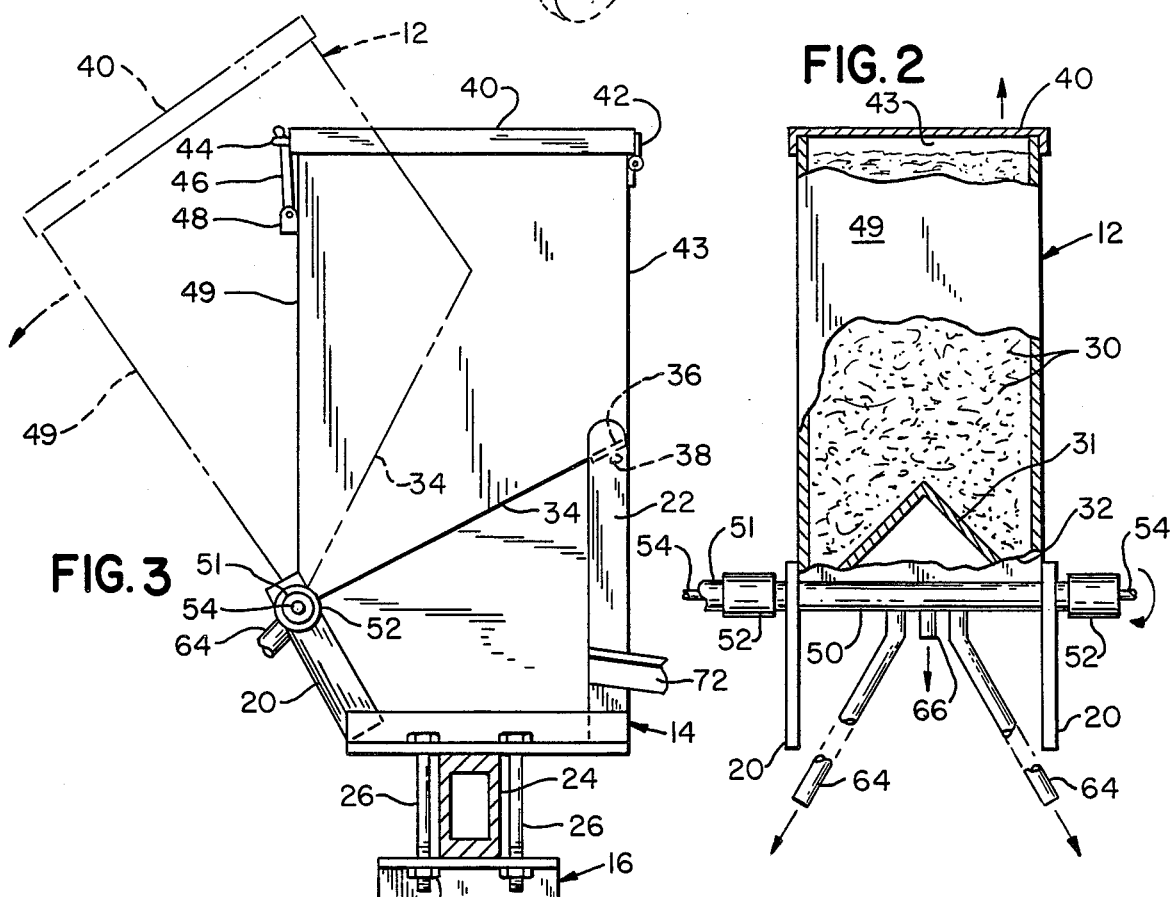
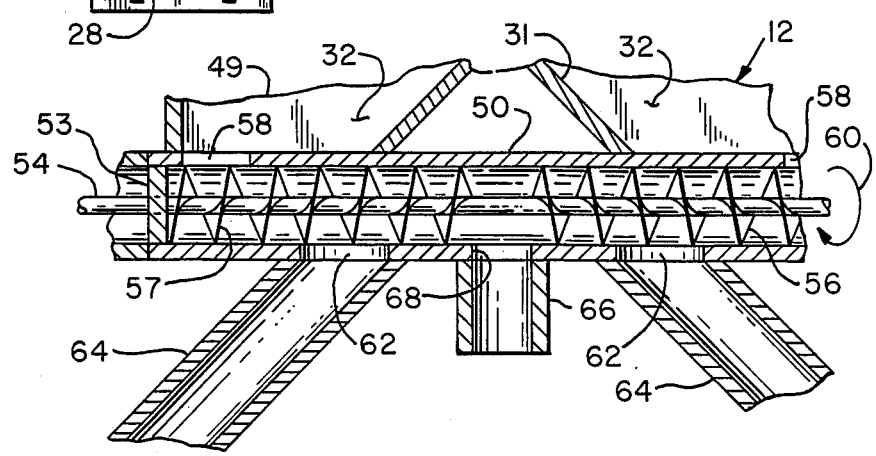

SCREW AUGER CHEMICAL APPLICATOR

BACKGROUND OF THE INVENTION

The instant invention relates generally to farming machinery, and more particularly, to a screw auger chemical applicator.

Numerous chemical devices have been provided in the prior art that are adapted to dispense chemicals to soil. For example, U.S. Pat. Nos. 3,240,401 of Kirschman, 3,155,288 of Landcraf, and 1,928,603 of Skareen, all are illustrative of such prior art. While these units may be suitable for the particular purpose to which they address, they would not be as suitable for the purpose of the present invention as hereafter described.

SUMMARY OF THE INVENTION

A primary object of the present invention is to provide a screw auger chemical applicator that will overcome the shortcomings of the prior art devices.

Another object is to provide a screw auger chemcal applicator that will be so designed, as to very efficiently dispense agricultural chemicals and small seeds.

An additional object is to provide a screw auger chemical applicator that will be of such design, as to have hoppers that will each feed out equal to each other.

A further object is to provide a screw auger chemical applicator that is simple and easy to use.

A still further object is to provide a screw auger chemical applicator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention being towed behind a tractor shown in phantom;

FIG. 2 is a fragmentary front elevational view of one of the chemical hoppers shown partly broken away;

FIG. 3 is a diagrammatic side elevational view of a hopper showing the mounting frame, and also showing a partial pivoting of a hopper in phantom;

FIG. 4 is an enlarged fragmentary view of a portion of FIG. 2, showing the auger feed of the invention; and FIG. 5 is a diagrammatic side view showing the auger drive mechanism.

DETAILED DESCRIPTION OF THE PREFERRED EMBODIMENTS

Turning now descriptively to the drawings, in which like reference characters denote like elements throughout the several views, an applicator 10 is shown to include a plurality of hoppers 12 mounted to a mounting frame 14 secured to a towed frame 16 behind a tractor 18. A pair of spaced short hopper support members 20 are fixedly secured to one side of mounting frame 14 at an angle, and a pair of vertical long hopper members 22 are similarly secured to the other side of the mounting frame 14, for supporting each hopper 12. Mounting frame 14 is spaced from the towed frame 16 by a length of square tubing 24, while secured in a sandwich like fashion by fasteners 26 and 28.

Chemical or small seeds 30 are stored within hoppers 12, and an inner sump wall 31 with an angled upward center portion, is fixedly secured to the interior side surfaces of hoppers 12, and provides for a pair of feed-down areas 32 for chemical or small seeds 30. The bottom wall 34 of each hopper 12 is angled forwardly for forward feed of chemical or small seeds 30, and a horizontal bar 36 is fixedly secured to each pair of hopper members 22 and provides for engagement with a typical latch 38 mounted to bottom wall 34. A top cover 40 is secured at one edge to a hinge 42 that is secured to a rear wall 43 of hopper 12, and close and release latch members 44, 46, and 48 are secured to cover 40 and the front wall 49 respectively.

Horizontal auger sleeves 50 are received through upper portions of the short pair of hopper members 20 and each are coupled to intermediate auger sleeves 51 by sleeve collars 52, and an inner wall 53 is fixedly secured in each end of the auger sleeves 50, for providing separation of the feeding operation of each hopper 12.

A common shaft 54 extends through all of the auger sleeves 50 and intermediate sleeves 51, and each area of common shaft 52 beneath its respective hopper 12, is provided with a right hand pitch auger 56 and a left hand pitch auger 57, so as to separately feed chemical or small seed 30 evenly from both areas 32, and also to prevent compacting of chemical or small seed 30 in the auger sleeves 50. An opening 58 in the auger sleeve 50 is provided there-through, in the areas 32 of feed-out from hopper 12, above the respective augers 56 and 57, and the common shaft 54 rotates in one direction only, as indicated by the arrow 60.

Beneath each auger 56 and 57 is an opening 62 through the auger sleeve 50, for the feed-out of 30 into a pair of angularly disposed feed-out tubes 64 that are fixedly secured to the outer periphery of auger sleeve 50, and a central by-pass tube 66 is fixedly secured to the outer periphery of auger sleeve 50 over an opening 68 in auger sleeve 50, for discharge of any of chemical or small seed 30 passing augers 56 and 57, thus positively preventing impacting of chemical or small seed 30 that can cause malfunctioning of applicator 10.

A sprocket and chain or pulley and belt drive train 70 is provided for the rotation of common shaft 54 for rotation of the augers attached 56 and 57, and is mounted to the pair of arms 72 fixedly secured to one end hopper 12, and a driven wheel 74 which is mounted to arms 72 and is in rolling engagement with one of a pair of trailing wheels 76 on a shaft 78 attached to the toward frame 16. The wheels 76 are freely rotatable and are in engagement with the ground surface 80.

In operation when tractor 18 is driven forward, the wheels 76 rotate, and one wheel 76 by being in engagement with wheel 74, causes the drive train 70 to rotate the common shaft 54 that rotates all of the augers 56 and 57 beneath the hoppers 12 simultaneously, thus feeding the chemical or small seed 30 from hoppers 12 out of the spread apart tubes 64. When and if some of chemical or small seed 30 passes an end of the augers 56 and 57, this chemical or small seed 30 in the center will not become impacted because it will be by-passed out of the by-pass tube 66 onto the ground surface 80.

It shall also be recognized that the hoppers 12 are pivotal for easy placement of the chemical 30, there is no waste of the chemical 30, the hoppers are waterproof, and are easy to clean when necessary.

What is claimed is:

1. A screw auger chemical applicator machine comprising, a mounting frame secured to a towed frame, for towing behind a farm tractor, a plurality of hoppers secured to said mounting frame, for dispensing chemical or small seed, an auger sleeve secured to each hopper of said plurality of hoppers, for housing a pair of augers that feed said chemical or small seed, a common shaft provided in said machine, for rotating said pair of augers, a drive train secured to said machine, for rotating said common shaft that rotates said pair of augers, wheel means secured to said machine, for driving said drive train, and a by-pass tube secured to said auger sleeve, for preventing compacting of said chemical or small seed, wherein each said hopper is mounted between a pair of short hopper support members and a pair of long hopper support members that are fixedly secured to said mounting frame that is secured to said towed frame that is horizontal to a ground surface, and said auger sleeve is fixedly secured to a front bottom end of said hopper, and a pair of openings in said bottom end of said hopper, aligned with a pair of openings through said auger sleeve for feeding said chemical or small seed into said auger sleeve, wherein a sump divider wall is fixedly secured to inside surfaces of walls of said hopper and a central portion is angled upward, causing said chemical or small seed to gravity feed out of two areas in said hopper into the openings through said auger sleeve, and a second pair of openings through said auger sleeve are provided and release said chemical or small seed into a pair of feed-out tubes that are angularly disposed to each other and are fixedly secured at one end over the second pair of openings through said auger sleeve, and said by-pass tube is located between said second pair of openings.

2. A screw auger chemical applicator machine as set forth in claim 1, wherein said common shaft extends through each said auger sleeve and a divider wall is fixedly secured in a bore of each said auger sleeve at each end and provides isolation separation of said chemical or small seed being received in said auger sleeve, and an intermediate sleeve positioned between each said hopper, also receives said common shaft, and said intermediate sleeve is coupled to said auger sleeve by a collar fixedly secured to an outer periphery of said intermediate sleeve and said auger sleeve, and one end of said common shaft is secured to one end of said drive train that drives said common shaft.

3. A screw auger chemical applicator machine as set forth in claim 2, wherein said pair of augers comprise one having a right hand pitch and a second of said pair of augers is of a left hand pitch, for feeding said chemical or small seed to a respective feed-out tube of said pair of feed-out tubes, and said drive train is supported and secured to a pair of arms fixedly secured one pair of said long hopper members of one hopper on and end of said mounting frame, and another end of said drive train is secured to a driven wheel of said wheel means.

4. A screw auger chemical applicator machine as set forth in claim 3, wherein said driven wheel engages rollingly with one trailing wheel of a pair mounted on a wheel shaft secured to said towed frame, and said one trailing wheel is in free rolling engagement with a ground surface.

* * * * *